United States Patent
Bauer et al.

(10) Patent No.: US 10,508,244 B2
(45) Date of Patent: Dec. 17, 2019

(54) METHOD FOR REMOVING NITROGEN FROM A HYDROCARBON-RICH FRACTION

(71) Applicant: LINDE AKTIENGESELLSCHAFT, Munich (DE)

(72) Inventors: Heinz Bauer, Ebenhausen (DE); Michael Warter, Oberhaching (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 91 days.

(21) Appl. No.: 15/560,789

(22) PCT Filed: Mar. 1, 2016

(86) PCT No.: PCT/EP2016/000353
§ 371 (c)(1),
(2) Date: Sep. 22, 2017

(87) PCT Pub. No.: WO2016/155863
PCT Pub. Date: Oct. 6, 2016

(65) Prior Publication Data
US 2018/0051215 A1    Feb. 22, 2018

(30) Foreign Application Priority Data
Mar. 31, 2015    (DE) .................. 10 2015 004 120

(51) Int. Cl.
*C10G 5/06* (2006.01)
*B01D 53/00* (2006.01)
*C10G 5/00* (2006.01)
(Continued)

(52) U.S. Cl.
CPC .............. *C10G 5/06* (2013.01); *B01D 53/002* (2013.01); *C10G 5/00* (2013.01); *F25J 3/0209* (2013.01);
(Continued)

(58) Field of Classification Search
CPC ... C10G 5/06; C10G 5/00; F25J 3/0214; F25J 3/04781; F25J 3/04793; F25J 3/0257;
(Continued)

(56) References Cited

U.S. PATENT DOCUMENTS 4,415,345 A * 11/1983 Swallow ................ F25J 3/0209
62/630
4,455,158 A * 6/1984 Vines ..................... F25J 3/0209
62/622
(Continued)

FOREIGN PATENT DOCUMENTS

DE    100 49 830 A1    4/2002

OTHER PUBLICATIONS

International Search Report, PCT Appln. PCT/EP2016/000353, Rijswijk, NL, dated May 3, 2016, Authorized Officer J. Pardo Torre, 2 pages.

*Primary Examiner* — Henry T Crenshaw
(74) *Attorney, Agent, or Firm* — Millen White Zelano & Branigan, PC

(57) ABSTRACT

A method of obtaining a liquefied hydrocarbon-rich fraction (product fraction) having a nitrogen content of ≤1 mol %, wherein the hydrocarbon-rich fraction is liquefied and subcooled with a refrigeration circuit and then subjected to a rectificative removal of nitrogen is disclosed.

15 Claims, 1 Drawing Sheet

(51) Int. Cl.
*F25J 3/02* (2006.01)
*F25J 3/04* (2006.01)

(52) U.S. Cl.
CPC ........... *F25J 3/0214* (2013.01); *F25J 3/0233* (2013.01); *F25J 3/0257* (2013.01); *F25J 3/04781* (2013.01); *F25J 3/04793* (2013.01); *B01D 2256/24* (2013.01); *B01D 2257/102* (2013.01); *F25J 2200/04* (2013.01); *F25J 2200/06* (2013.01); *F25J 2215/04* (2013.01); *F25J 2230/08* (2013.01); *F25J 2270/90* (2013.01)

(58) Field of Classification Search
CPC ...... F25J 3/0233; F25J 3/0209; F25J 2200/06; F25J 2215/04; F25J 2200/04; F25J 2270/90; F25J 2230/08; F25J 3/066; B01D 53/002; B01D 2256/24; B01D 2257/102
USPC .................................................. 62/623, 630
See application file for complete search history.

(56) References Cited

U.S. PATENT DOCUMENTS

| | | | | |
|---|---|---|---|---|
| 4,878,932 | A * | 11/1989 | Phade | F25J 3/0209 62/620 |
| 5,617,741 | A * | 4/1997 | McNeil | F25J 3/0209 62/622 |
| 5,682,761 | A * | 11/1997 | Nagamura | B01D 53/0423 62/643 |
| 7,520,143 | B2 * | 4/2009 | Spilsbury | F25J 1/0015 62/620 |
| 2004/0103687 | A1 * | 6/2004 | Clare | F25J 3/0209 62/621 |
| 2004/0231359 | A1 * | 11/2004 | Brostow | C10L 3/10 62/623 |
| 2012/0041248 | A1 * | 2/2012 | Sapper | F25J 3/0209 585/800 |
| 2012/0090355 | A1 * | 4/2012 | Johnson | F25J 3/0209 62/618 |

* cited by examiner

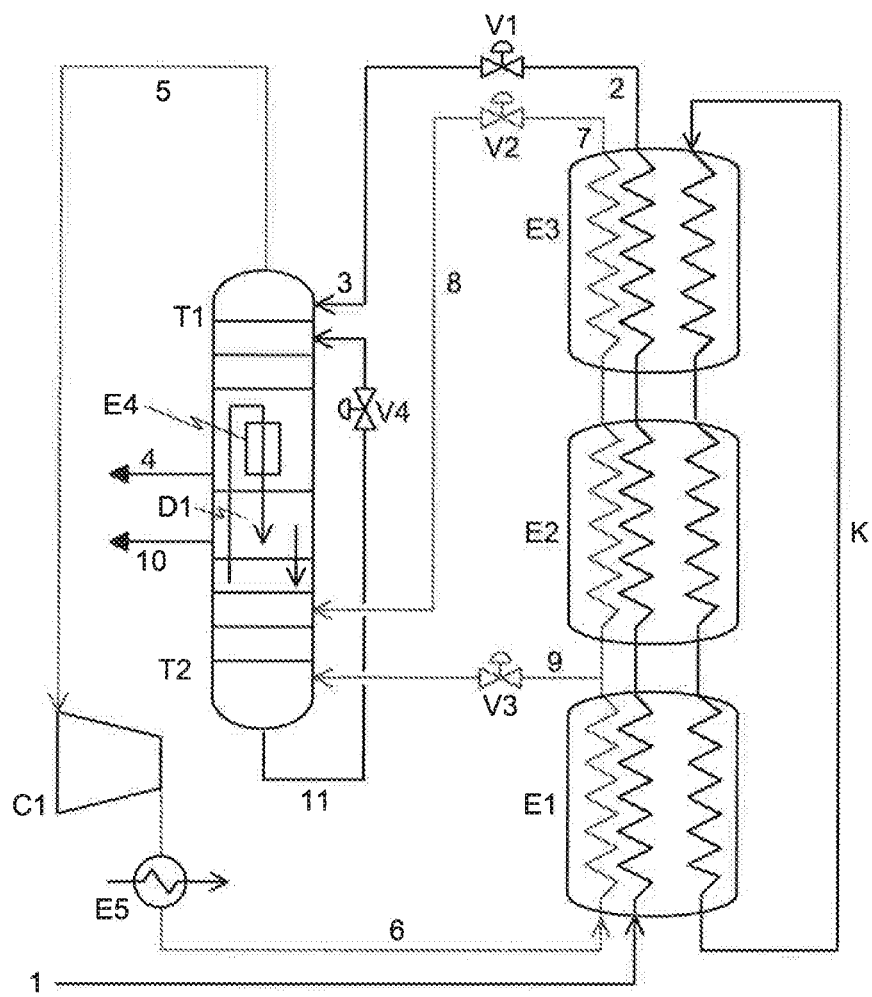

METHOD FOR REMOVING NITROGEN FROM A HYDROCARBON-RICH FRACTION

CROSS-REFERENCE TO RELATED APPLICATIONS

This application claims priority under 35 USC § 119 to International Patent Application No. PCT/EP2016/000353, filed on Mar. 1, 2016 which claims priority from German Patent Application DE 10 2015 004 120.7, filed on Mar. 31, 2015.

BACKGROUND OF THE INVENTION

The invention relates to a method of obtaining a liquefied hydrocarbon-rich fraction (product fraction) having a nitrogen content of ≤1 mol %, wherein the hydrocarbon-rich fraction is liquefied and subcooled with a refrigeration circuit and then subjected to a rectificative removal of nitrogen.

The term "refrigeration circuit" hereinafter shall be understood to mean any refrigeration system and any refrigeration circuit by means of which a hydrocarbon-rich fraction can be liquefied and then subcooled. Merely illustrative examples include coolant (mixture) circuits with and without phase change, expander circuits, absorption refrigeration systems, etc.

SUMMARY OF THE INVENTION

Nitrogen-containing natural gases require suitable measures on liquefaction to not allow the nitrogen concentration in the LNG (liquefied natural gas) to grow above 1 mol %, since it is possible in this case for unwanted and hazardous layers of LNG of different density to arise in the LNG storage tank. A known method of discharging nitrogen is to draw off a fuel gas stream at the cold end of the natural gas liquefaction process, having a distinctly elevated nitrogen content compared to the raw gas. It is thus possible for the LNG to achieve its specification of not more than 1 mol % of nitrogen even though the nitrogen concentration in the raw gas is well above 1 mol %. If a gas turbine is to accept at least a portion of this fuel gas, according to the design of the gas turbine, a maximum permissible nitrogen concentration of 15 to 45 mol % should be observed here too.

However, if the nitrogen content in the natural gas is so high that it is not possible to simultaneously comply with the maximum permissible nitrogen content in the LNG and in the fuel gas, it is customary to draw off a highly concentrated nitrogen stream containing ≥99 mol % of nitrogen and release it directly to the atmosphere. This highly concentrated nitrogen stream can be effected via separation of the fuel gas in what is called an NRU (nitrogen rejection unit) downstream of the actual natural gas liquefaction process or by means of an $N_2/CH_4$ separation integrated into the natural gas liquefaction process, as known, for example, from U.S. Pat. No. 7,520,143. In this $N_2/CH_4$ separation, a highly concentrated nitrogen fraction, a nitrogen/hydrocarbon mixture and an LNG product fraction are drawn off from the separation process. Nitrogen is separated here from the overall raw gas stream in a column and released in technical grade purity. This significant nitrogen enrichment proceeding from the nitrogen content in the raw gas up to typically ≥99 mol % of nitrogen, which takes place at a poor gas/liquid equilibrium owing to the elevated pressure, entails comparatively high separation intensity and hence energy intensity. In many cases, however, it is desirable not to release any further fraction aside from LNG and a highly concentrated nitrogen fraction.

It is an object of the present invention to specify a method of the generic type for obtaining a liquefied hydrocarbon-rich product fraction having a nitrogen content of ≤1 mol %, in which the release of a nitrogen/hydrocarbon mixture is avoided while maintaining low capital and operating costs and, aside from the liquefied hydrocarbon-rich product fraction, only a highly concentrated nitrogen fraction having a nitrogen content of at least 98 mol %, preferably ≥99 mol %, is obtained.

For achievement of this object, a method of the generic type for obtaining a liquefied hydrocarbon-rich product fraction having a nitrogen content of ≤1 mol % is proposed, which is characterized in that
a) the liquefied and subcooled hydrocarbon-rich fraction is expanded and fed to a nitrogen stripping column,
b) the product fraction is drawn off from the bottom thereof,
c) a nitrogen-enriched fraction is drawn off from the top thereof, compressed, liquefied and subcooled with the refrigeration circuit, expanded and fed to a high-pressure nitrogen column,
d) a substream of the nitrogen-enriched fraction from the high-pressure nitrogen column which has been cooled with the refrigeration circuit is fed in as reboil stream and
e) a nitrogen-depleted fraction is drawn off from the bottom thereof and fed to the stripping column,
f) wherein the two columns are thermally coupled via a heat exchanger which serves as reboiler for the nitrogen stripping column and as tops condenser for the high-pressure nitrogen column and
g) there is a reflux collector arranged between the two columns, from which a gaseous and/or liquid high-purity nitrogen stream is drawn off.

The method of the invention for obtaining a liquefied hydrocarbon-rich product fraction having a nitrogen content of ≤1 mol % enables the fractionation of the hydrocarbon-rich fraction to be liquefied or of the natural gas to be liquefied to give on-spec LNG and nitrogen of what is called technical grade purity. No further products/product streams, more particularly nitrogen/methane mixtures, are obtained. At a comparatively low pressure which is advantageous for the gas/liquid equilibrium and hence the separation complexity, the nitrogen stripping column reduces the nitrogen content to ≤1 mol % in the product fraction drawn off from the bottom of the nitrogen stripping column, without making particular demands on the purity of the nitrogen-enriched fraction drawn off at the top of this column in relation to its nitrogen content. This nitrogen-enriched fraction is only a portion of the hydrocarbon-rich fraction to be liquefied. Since it is only this nitrogen-enriched fraction which is subjected to the ultimate nitrogen enrichment to >98 mol % in the high-pressure nitrogen column, the apparatus complexity and energy intensity is significantly reduced compared to the methods known from the prior art.

Further advantageous configurations of the method of the invention for obtaining a liquefied hydrocarbon-rich product fraction that are subjects of the dependent claims are characterized in that
  the hydrocarbon-rich fraction to be liquefied has a nitrogen content of at least 2 mol %, preferably of at least 3 mol %,
  the liquefied and subcooled hydrocarbon-rich fraction (2) is expanded to a pressure between 1.1 and 2.0 bar, preferably between 1.15 and 1.5 bar, the nitrogen-enriched fraction drawn off at the top of the nitrogen stripping column is compressed to a pressure between 25 and 50 bar, preferably between 30 and 45 bar, the high-pressure nitrogen column is operated at a pressure between 20 and 30 bar, preferably between 22 and 27 bar, the amount of the reboil stream is between 10% and 70%, preferably between 20% and 50%, of the amount of the compressed nitrogen-enriched fraction, the high-purity nitrogen stream drawn off from the reflux collector has a nitrogen content of at least 98 mol %, preferably of at least 99 mol %, the nitrogen-enriched fraction drawn off at the top of the nitrogen stripping column has a nitrogen content between 10 and 60 mol %, preferably between 30 and 50 mol %, if fuel gas is required at at least one point in the method, the fuel gas used is a substream of the hydrocarbon-rich fraction to be liquefied and/or a substream of the compressed nitrogen-enriched fraction to be cooled.

BRIEF DESCRIPTION OF THE DRAWINGS

The method of the invention for obtaining a liquefied hydrocarbon-rich product fraction and further advantageous configurations thereof are elucidated in detail by the working example shown in the FIGURE.

DETAILED DESCRIPTION OF THE INVENTION

The hydrocarbon-rich fraction 1 to be liquefied is liquefied and subcooled in the heat exchangers or heat exchange regions E1, E2 and E3 with a refrigeration circuit. For the sake of clarity, the refrigeration circuit K is shown merely in schematized form. The construction thereof is of no significance for the implementation of the method of the invention. It merely has to be designed such that it can provide sufficient refrigeration output for the liquefaction and subcooling of the hydrocarbon-rich fraction and for the liquefaction and subcooling of the nitrogen-enriched fraction 5 drawn off at the top of the nitrogen stripping column T1, which will be discussed in detail hereinafter. In the embodiment shown in FIG. 1, the liquefaction and subcooling of the hydrocarbon-rich fraction 1 and of the aforementioned nitrogen-enriched fraction 5 are effected in three heat exchangers or heat exchange regions E1 to E3, where the heat exchanger E1 serves for cooling, heat exchanger E2 for liquefaction and heat exchanger E3 for subcooling of the aforementioned fractions. Rather than the three heat exchangers E1 to E3 shown, any combinations of heat exchangers are implementable, which means that it is also possible to use, for example, what is called a helically coiled heat exchanger.

The subcooled hydrocarbon-rich fraction 2 has a temperature between −150 and −160° C. It is expanded in the valve V1 to a pressure between 1.1 and 2.0 bar, preferably between 1.15 and 1.5 bar, and applied to a nitrogen stripping column T1 in the top region thereof as reflux 3. By means of the heat exchanger or reboiler E4, the heating of which will be elucidated hereinafter, a nitrogen content of ≤1 mol % is established in the bottom of the nitrogen stripping column T1. It is thus possible to draw off a product fraction 4 having a nitrogen content of ≤1 mol % from the bottom of the nitrogen stripping column T1. This product fraction 4 is then sent to its further use, for example intermediate storage in an LNG storage vessel.

At the top of the nitrogen stripping column T1, a nitrogen-enriched fraction 5 is drawn off, having a higher nitrogen content compared to the liquefied hydrocarbon-rich fraction 3. The nitrogen content thereof is between 10 and 60 mol %, preferably between 30 and 50 mol %. It is compressed in the compressor C1 to a pressure between 25 and 50 bar, preferably between 30 and 45 bar. In the downstream heat exchanger E5, the heat of compression is removed and the compressed nitrogen-enriched fraction 6 is cooled down to ambient temperature. Subsequently, like the hydrocarbon-rich fraction 1, it is cooled down in the heat exchangers E1 to E3 to a temperature between −150 and −160° C.; this results in full condensation and subsequent subcooling of the nitrogen-enriched fraction.

The liquefied nitrogen-enriched fraction 7 is expanded in the valve V2 and fed to the high-pressure nitrogen column T2 via conduit 8. This is operated at a pressure of 20 to 30 bar, preferably of 22 to 27 bar. The top condenser used in the high-pressure nitrogen column T2 is the above-described heat exchanger E4 in which condensing nitrogen from the high-pressure nitrogen column T2 covers the heat demand of the hydrocarbon-rich stream or LNG that reboils in the bottom of the nitrogen stripping column T1. There is a reflux collector D1 arranged between the two columns T1/T2, from which a gaseous and/or a liquid high-purity nitrogen stream 10 is/are drawn off. This is nitrogen of what is called technical grade purity, having a nitrogen content of at least 98 mol %, preferably of at least 99 mol %.

The high-pressure nitrogen column T2 is supplied at a suitable temperature with a substream of the nitrogen-enriched fraction 5/6 which has been cooled down with the refrigeration circuit K via the valve V3 as reboil stream. The amount of the reboil stream 9 is preferably between 10% and 70%, especially between 20% and 50%, of the amount of the compressed nitrogen-enriched fraction 6. The reboil stream 9 can be drawn off between the heat exchangers E1 and E2, but also between the heat exchangers E2 and E3.

A nitrogen-depleted fraction 11 is drawn off from the bottom of the high-pressure nitrogen column T2, having a lower nitrogen content compared to the nitrogen-enriched fraction 5. It is expanded in the valve V4 and fed to the nitrogen stripping column T1 beneath the feed point of the liquefied hydrocarbon-rich fraction 3.

If fuel gas is required at at least one point in the method, the fuel gas used may be a substream of the hydrocarbon-rich fraction 1 to be liquefied and/or a substream of the compressed nitrogen-enriched fraction 6 to be cooled.

What we claim is:

1. A method of obtaining a liquefied hydrocarbon-rich fraction having a nitrogen content of ≤1 mol %, said method comprising:

liquefying and subcooling a hydrocarbon-rich feed fraction with a refrigeration circuit, expanding the liquefied and subcooled hydrocarbon-rich feed fraction and feeding the expanded hydrocarbon-rich feed fraction into a nitrogen stripping column, withdrawing said liquefied hydrocarbon-rich fraction having a nitrogen content of ≤1 mol % from the bottom of said nitrogen stripping column, withdrawing a nitrogen-enriched fraction from the top of said nitrogen stripping column, compressing said nitrogen-enriched fraction, liquefying and subcooling said nitrogen-enriched fraction with the refrigeration circuit, expanding said nitrogen-enriched fraction and feeding said nitrogen-enriched fraction into a high-pressure nitrogen column, wherein a substream of the nitrogen-enriched fraction which has been cooled with the refrigeration circuit is fed to said high-pressure nitrogen column as a reboil stream, and withdrawing a nitrogen-depleted fraction from the bottom of said high-pressure nitrogen column and feeding said nitrogen-depleted fraction to the stripping column, wherein the stripping column and the nitrogen-depleted fraction are thermally coupled via a heat exchanger which serves as reboiler for the nitrogen stripping column and as tops condenser for the high-pressure nitrogen column, and g) wherein a reflux collector is arranged between the stripping column and the nitrogen-depleted fraction, and a gaseous and/or liquid high-purity nitrogen stream is withdrawn from said reflux collector.

2. The method as claimed in claim 1, wherein the hydrocarbon-rich feed fraction has a nitrogen content of at least 2 mol %.

3. The method as claimed in claim 1, wherein the liquefied and subcooled hydrocarbon-rich feed fraction is expanded to a pressure between 1.1 and 2.0 bar.

4. The method as claimed in claim 1, wherein the nitrogen-enriched fraction withdrawn from the top of the nitrogen stripping column is compressed to a pressure between 25 and 50 bar.

5. The method as claimed in claim 1, wherein the high-pressure nitrogen column is operated at a pressure between 20 and 30 bar.

6. The method as claimed in claim 1, wherein the amount of the reboil stream is between 10% and 70% of the amount of the compressed nitrogen-enriched fraction.

7. The method as claimed in claim 1, wherein the high-purity nitrogen stream withdrawn from the reflux collector has a nitrogen content of at least 98 mol %.

8. The method as claimed in claim 1, wherein the nitrogen-enriched fraction withdrawn from the top of the nitrogen stripping column has a nitrogen content between 10 and 60 mol %.

9. The method as claimed in claim 2, wherein the nitrogen content of the hydrocarbon-rich feed fraction is at least 3 mol %.

10. The method as claimed in claim 3, wherein the liquefied and subcooled hydrocarbon-rich feed fraction is expanded to a pressure between 1.15 and 1.5 bar.

11. The method as claimed in claim 4, wherein the nitrogen-enriched fraction withdrawn from the top of the nitrogen stripping column is compressed pressure between 30 and 45 bar.

12. The method as claimed in claim 5, wherein the high-pressure nitrogen column is operated at a pressure between 22 and 27 bar.

13. The method as claimed in claim 6, wherein the amount of the reboil stream is between 20% and 50% of the amount of the compressed nitrogen-enriched fraction.

14. The method as claimed in claim 7, wherein the high-purity nitrogen stream withdrawn from the reflux collector has a nitrogen content of at least 99 mol %.

15. The method as claimed in claim 8, wherein the nitrogen-enriched fraction withdrawn from the top of the nitrogen stripping column has a nitrogen content is between 30 and 50 mol %.

* * * * *